(12) United States Patent
Walley et al.

(10) Patent No.: US 11,005,526 B2
(45) Date of Patent: May 11, 2021

(54) ECHO CANCELLATION LEVERAGING OUT-OF-BAND FREQUENCIES

(71) Applicant: Maxlinear, Inc., Carlsbad, CA (US)

(72) Inventors: Kenneth Scott Walley, Carlsbad, CA (US); Steve Krapp, Naperville, IL (US); Eitan Tsur, Tel Aviv (IL); Sridhar Ramesh, Carlsbad, CA (US)

(73) Assignee: MaxLinear, Inc., Carlsbad, CA (US)

( * ) Notice: Subject to any disclaimer, the term of this patent is extended or adjusted under 35 U.S.C. 154(b) by 50 days.

(21) Appl. No.: 16/358,093

(22) Filed: Mar. 19, 2019

(65) Prior Publication Data

US 2019/0296791 A1    Sep. 26, 2019

Related U.S. Application Data

(60) Provisional application No. 62/645,231, filed on Mar. 20, 2018.

(51) Int. Cl.
*H04B 3/20* (2006.01)
*H04L 5/14* (2006.01)

(52) U.S. Cl.
CPC ........ *H04B 3/20* (2013.01); *H04L 5/14* (2013.01)

(58) Field of Classification Search
None
See application file for complete search history.

(56) References Cited

U.S. PATENT DOCUMENTS

| 2015/0052572 | A1* | 2/2015 | Schemmann | H04N 21/6118 |
| | | | | 725/116 |
| 2018/0234130 | A1* | 8/2018 | Chapman | H04B 3/23 |
| 2018/0287659 | A1 | 10/2018 | Ramesh | |

OTHER PUBLICATIONS

Jin et al., Echo Cancellation Techniques for Supporting Full Duplex DOCSIS, 2017, SCTE-ISBE and NCTA, pp. 1-24. (Year: 2017).*
Data-Over-Cable Service Interface Specifications DOCSIS® 3.1 Physical Layer Specification CM-SP-PHYv3.1-I13-171220, © Cable Television Laboratories, Inc. 2013-2017 (295 pgs).

* cited by examiner

*Primary Examiner* — Nicholas Sloms
(74) *Attorney, Agent, or Firm* — Maschoff Brennan

(57) ABSTRACT

An electronic communication device comprises echo cancellation circuitry and signal modification circuitry. The echo cancellation circuitry may be operable to generate a first signal that approximates interference present in a second signal. The signal modification circuitry may be operable to generate a first cancellation signal in a frequency band that is not used on a communication medium over which the electronic communication device is configured to communicate. The signal modification circuitry may be operable to combine the first cancellation signal with the first signal, wherein the combining of the signals results in a modified first signal that has a lower crest factor and/or peak-to-average power ratio than the first signal. The signal modification circuitry may be operable to combine the modified first signal with the second signal to reduce interference present in the second signal.

20 Claims, 6 Drawing Sheets

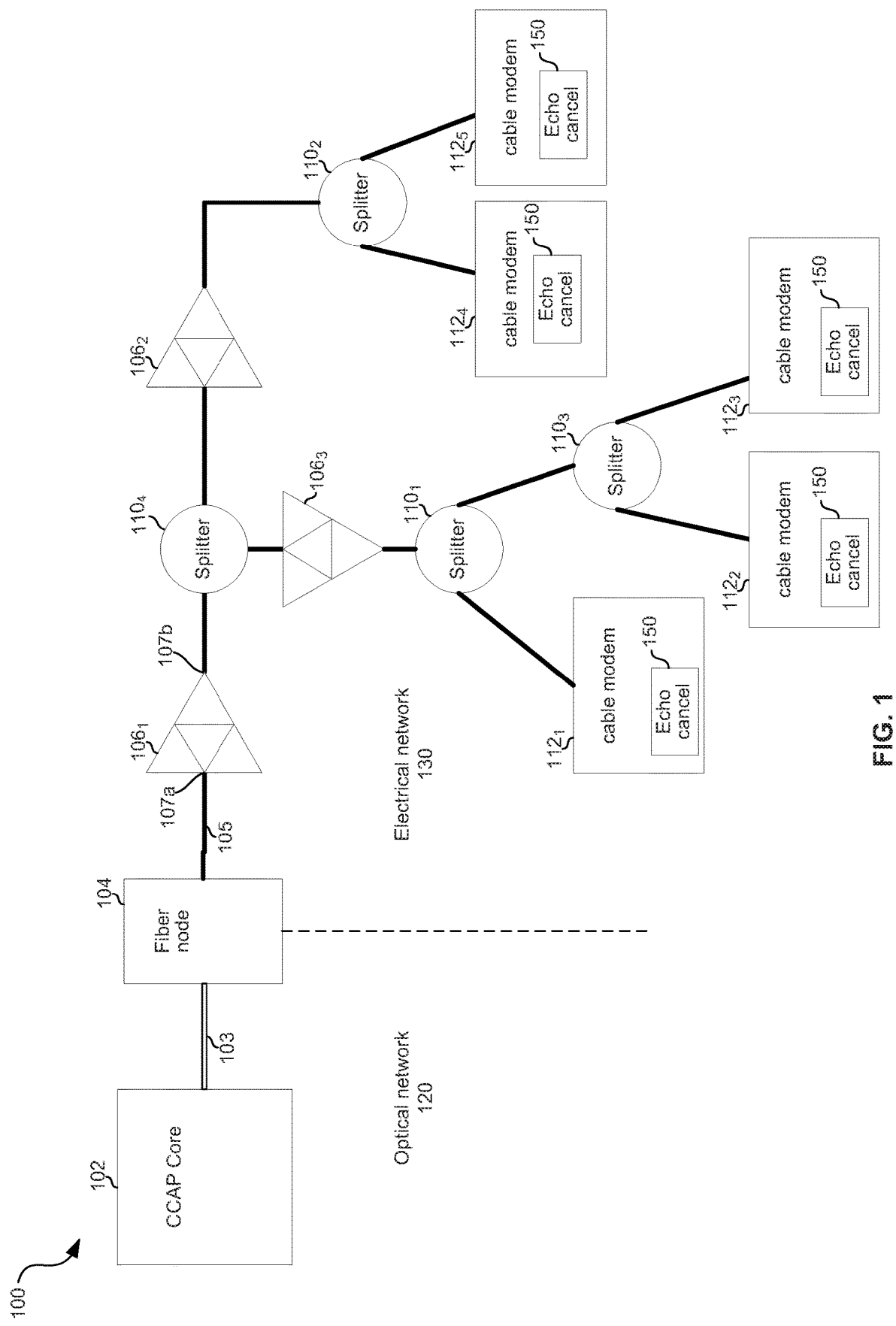

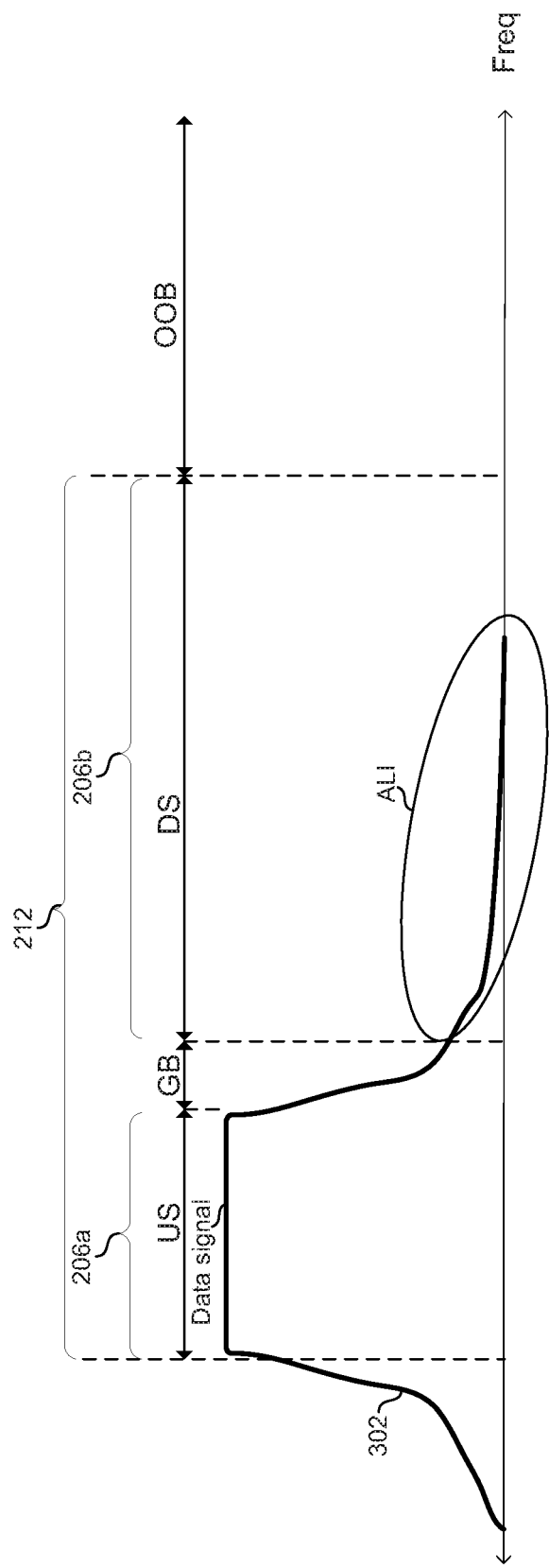

ECHO CANCELLATION LEVERAGING OUT-OF-BAND FREQUENCIES

PRIORITY CLAIM

This application claims the benefit of priority to U.S. Provisional Patent Application 62/645,231 filed Mar. 20, 2018, which is hereby incorporated herein by reference in its entirety.

INCORPORATION BY REFERENCE

This application makes reference to:
U.S. patent application Ser. No. 15/938,937 titled "Full Duplex DOCSIS Cable Modem Echo Cancellation with Training" and filed on Mar. 28, 2018;
U.S. patent application Ser. No. 16/356,216 titled "Coordinated Background Training in a Full-Duplex Hybrid Fiber-Coaxial Network" filed on Mar. 18, 2019; and
U.S. patent application Ser. No. 16/294,244 titled "Foreground Training in a Hybrid Fiber-Coaxial Network with Remote-PHY" and filed on Mar. 6, 2019.
Each of the above-referenced documents is hereby incorporated herein by reference in its entirety.

BACKGROUND

Conventional systems and methods for communications can be overly power hungry, slow, expensive, and inflexible. Further limitations and disadvantages of conventional and traditional approaches will become apparent to one of skill in the art, through comparison of such systems with some aspects of the present invention as set forth in the remainder of the present application with reference to the drawings.

BRIEF SUMMARY

Systems and methods for echo cancellation leveraging out-of-band frequencies, substantially as shown in and/or described in connection with at least one of the figures, as set forth more completely in the claims.

Advantages, aspects and novel features of the present disclosure, as well as details of various implementations thereof, will be more fully understood from the following description and drawings.

BRIEF DESCRIPTION OF THE DRAWINGS

FIG. 1 is a diagram depicting an example hybrid fiber-coaxial (HFC) network.

FIG. 3 illustrates an example upstream signal in a full-duplex network.

DETAILED DESCRIPTION OF THE INVENTION

Figure 2A:
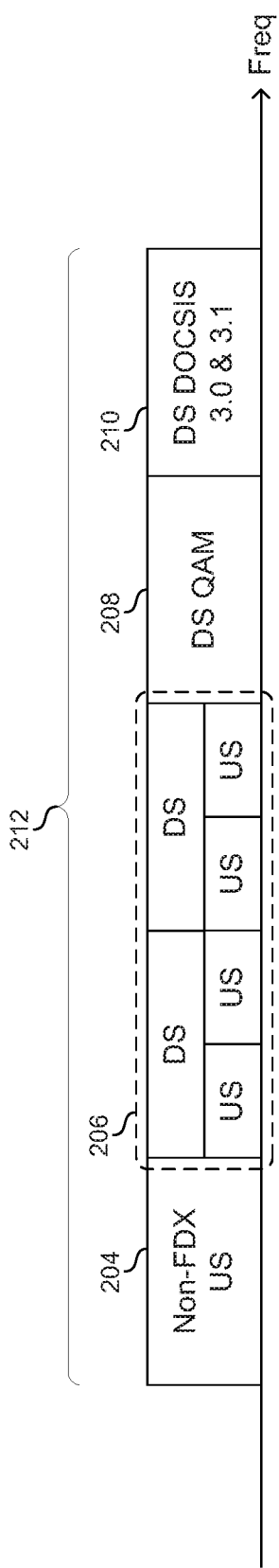
FIGS. 2A and 2B show example frequency plans for a full-duplex DOCSIS network.

FIG. 1 is a diagram depicting an example hybrid fiber-coaxial (HFC) network. The example HFC network 100 comprises a converged cable access platform (CCAP) core 102, a remote-PHY fiber node 104, amplifiers $106_1$-$106_3$, splitters $110_1$-$110_4$, and cable modems (CMs) $112_1$-$112_5$.

The CCAP core 102 comprises circuitry operable to handle data over coaxial service interface specification (DOCSIS) traffic to and from the cable modems $112_1$-$112_5$. The CCAP core 102 is operable to manage the allocation/reservation of frequency bands (resource blocks) on the network 100. The CCAP core 102 is coupled to the remote-PHY fiber node via fiber optic cable 103.

The remote-PHY fiber node 104 comprises circuitry operable to provide an interface between the optical network 120 and the electrical network 130. The fiber node 104 is operable to communicate full-duplex on one or more frequency bands on the electrical network 130. The remote-PHY 104 is coupled to amplifier $106_1$ via coaxial cable 105.

Each of the amplifiers $106_1$-$106_3$ may comprise a bidirectional amplifier which may amplify downstream signals and upstream signals, where downstream signals are input to an amplifier $106x$ (x being 1, 2, or 3 for the amplifiers shown in FIG. 1) via its upstream interface 107a and output via its downstream interface 107b, and upstream signals are input to an amplifier $106x$ via downstream interface 107b and output via its upstream interface 107a. The amplifier $106_1$, which amplifies signals along the main coaxial "trunk," may be referred to as a "trunk amplifier." The amplifiers $106_2$ and $106_3$, which amplify signals along "branches" split off from the trunk, may be referred to as "branch" or "distribution" amplifiers.

Each of the splitters $110_1$-$110_4$ comprises circuitry operable to output signals incident on each of its interfaces onto each of its other interfaces. Each of the splitters $110_1$-$110_4$ may be a passive or active device which supports bidirectional transfer of signals.

Each of the cable modems $112_1$-$112_5$ is operable to communicate with, and be managed by, the CCAP core 102 in accordance with one or more standards (e.g., DOCSIS 3.0 and/or 3.1). Each of the cable modems $112_1$-$112_5$ may reside at the premises of a cable/DOCSIS subscriber. Each of the cable modems 1121-1125 comprises echo cancellation circuitry 150.

Figure 2B:
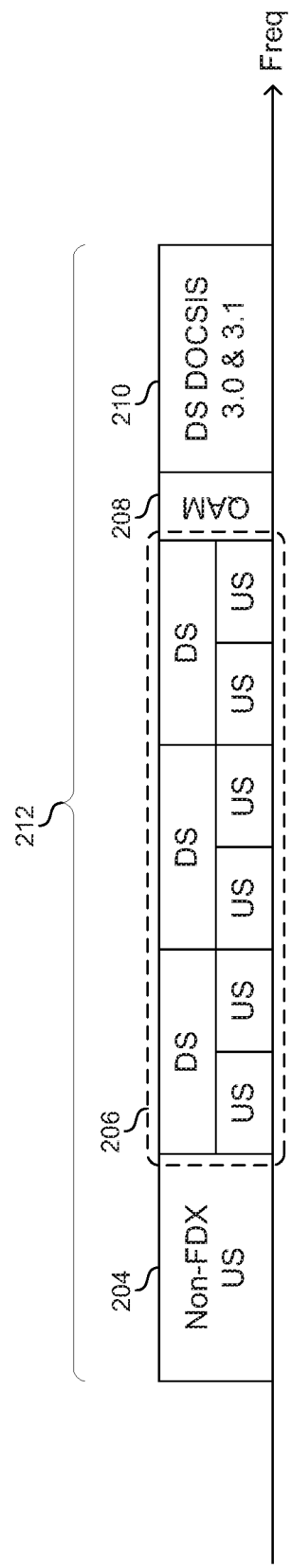

FIGS. 2A and 2B show example frequency plans for full-duplex DOCSIS network. The two example frequency plans each comprise a band of operation 212 in which resides: a band of frequencies 204 that is used only for upstream (US), a full-duplex band of frequencies 206 that are used for downstream and upstream, a band of frequencies 208 used only for downstream cable television ("QAM") signals 208, and a band of frequencies 210 used for downstream DOCSIS signals. Because the subbands of band 206 are dynamically assigned, per cable modem, to either upstream or downstream, a cable modem $112n$ operating the subbands of band 206 must be able to support upstream or downstream on each of the subbands within band 206. This means that a cable modem $112_n$ cannot use fixed diplexer filters for suppressing adjacent channel interference (ACI) and adjacent leakage interference (ALI) on the band 206. Furthermore, configurable diplexer filters are very difficult and costly to implement. Accordingly, a cable modem $112_n$ may comprises echo cancellation circuitry for dealing with adjacent channel interference (ACI) and adjacent leakage interference (ALI) on band 206. For example, echo cancellation may target ~50 dB of margin for ACI and ~55 dB of margin for ALI, to ensure the ability to receive 4K QAM downstream signals.

FIG. 3 illustrates an example upstream signal in a full-duplex network. In the example shown, subband 206 a is assigned for upstream traffic and subband 206 b is assigned for downstream traffic, with guard band (GB) in between them. As shown, due to non-idealities, the upstream signal 302 generated on subband 206 $a$ by a cable modem 112 $n$ leaks into the downstream subband 206 $b$. This type of interference is referred to as adjacent leakage interference (ALI). ALI incident on a receiver (e.g., due to transmit-chain-to-receive-chain leakage and/or reflections) negatively impacts performance.

Another type of interference present in full-duplex systems is adjacent channel interference (ACI). ACI is the result of the strong upstream signal in band 206$a$ leaking into (e.g., through diplexer 438 in FIG. 4), and/or reflecting back to (e.g., off of a splitter 110 of FIG. 1), the receive circuitry. Although ACI is out-of-band with the downstream signal, it nevertheless negatively impacts receive performance in a receiver (e.g., cable modem $112_n$ or fiber node 104) because it desensitizes receive circuitry of the transceiver.

Figure 4:
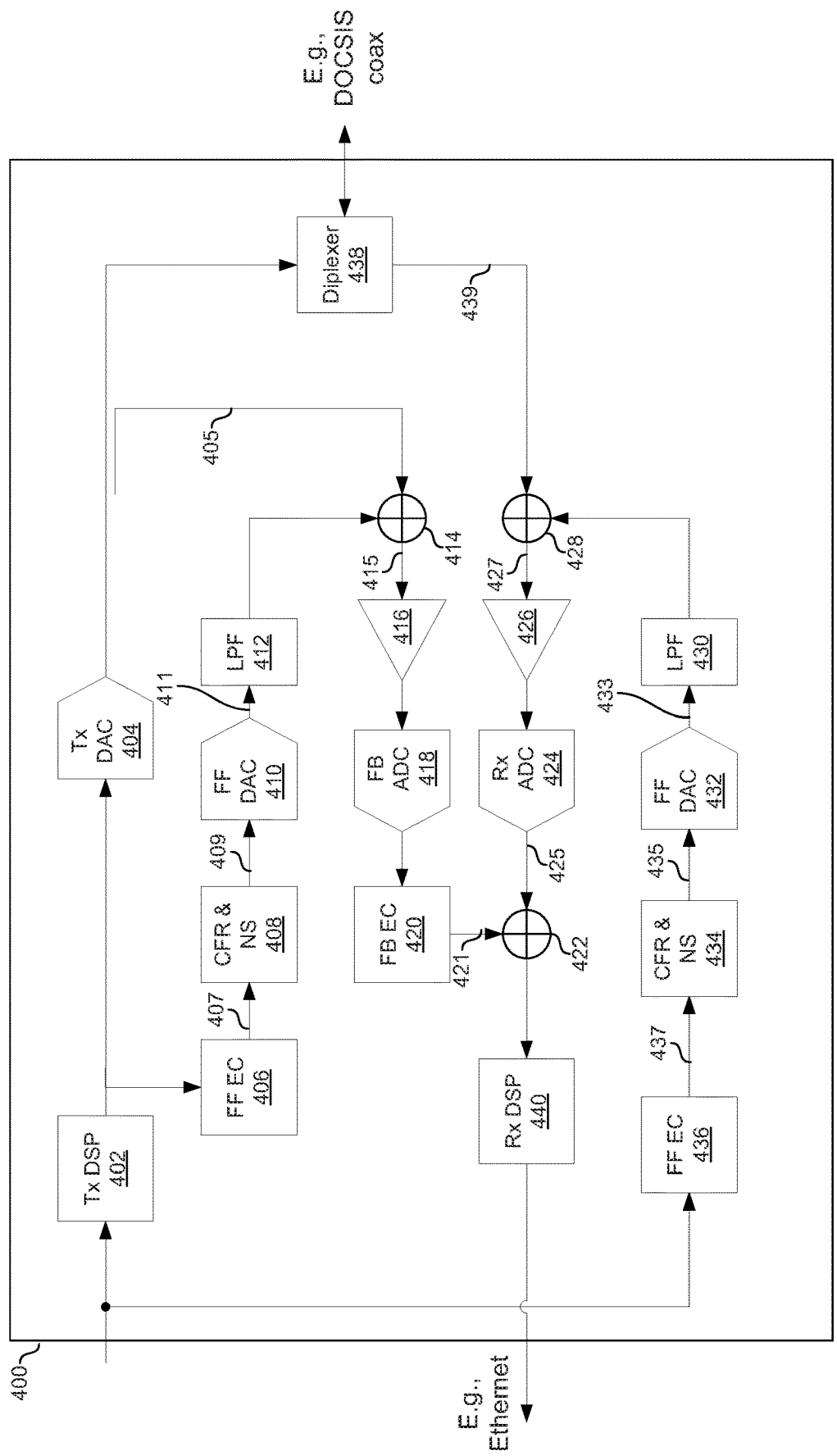
FIG. 4 illustrates example circuitry of a full duplex transceiver operable to perform echo cancellation.

FIG. 4 illustrates example circuitry of a full-duplex transceiver operable to perform echo cancellation to help mitigate the effects of ACI and ALI in a full-duplex system. The example circuitry 400 of cable modem 112 $n$ comprises diplexer 438, transmit (Tx) digital signal processing (DSP) circuitry 402, upstream (US) digital to analog conversion (DAC) circuitry 404, feedforward (FF) echo canceller (EC) circuitry 406, crest factor reduction (CFR) and noise shaping (NS) circuitry 408, feedforward DAC 410, low pass filter (LPF) 412, combiner 414, amplifier 416, feedback (FB) analog-to-digital converter (ADC) 418, feedback echo canceller 420, combiner 422, receive (Rx) ADC 424, Rx amplifier 426, combiner 428, lowpass filter 430, feedforward DAC 432, crest factor reduction (CFR) and noise shaping (NS) circuitry 434, feedforward EC 436, and receive (Rx) DSP 440. In an example implementation, one or more of the components shown in FIG. 4 correspond to the echo cancellation circuitry 150 of FIG. 1.

In operation, a digital upstream signal generated by the TX DSP 402 is converted to analog by DAC 404 and then output onto the communication medium (e.g., coaxial cable) via diplexer 438. Concurrently, a downstream signal is received from the medium, amplified by amplifier 426, converted to a digital signal by Rx ADC 424, combined with signal 421 in combiner 422, and processed by receive DSP 440 to generate the received signal output from the transceiver 400 (e.g., onto an Ethernet local area network).

As discussed with reference to FIG. 3, the upstream signal results in ALI incident on receive amplifier 426. The feedback path comprising amplifier 416, feedback ADC 418, and feedback echo canceller 420 attempts to cancel the ALI by synthesizing a 180° out-of-phase approximation of the ALI present in signal 425 such that when signals are combined in combiner 422, the ALI is canceled. In practice, however, the ACI resulting from the upstream signal being transmitted by the cable modem $112_n$ reduces the effectiveness of the feedback path in cancelling ALI.

To reduce the ACI and achieve better ALI cancelation, the example transceiver 400 comprises two feedforward echo cancellation paths. The first feedforward echo cancellation path comprising feedforward echo canceller 436, CFR & NS circuit 434, DAC 432 and LPF 430 generates a 180° out-of-phase synthesized approximation of the ACI present in the received signal 439 such that the ACI is canceled in combiner 428. Similarly, the second feedforward echo cancellation path comprising feedforward echo canceller 406, CFR & NS circuit 408, DAC 410 and LPF 412 generates a 180° out-of-phase synthesized approximation of the ACI present in the feedback signal 405 such that the ACI is canceled in combiner 414.

The effectiveness of the feedforward echo cancellation paths is limited by the dynamic range of the DACs 410 and 432. Accordingly, the CFR & NS circuits 408 and 434 operate to: (1) reduce the crest factor (CF) and/or the peak to average power ratio (PAPR) of the signals 409 and 435; and (2) shape the noise in the signals 411 and 433 output by the DACs 410 and 432. In an example implementation, the CFR & NS circuits 408 and 434 each adds a cancellation signal to its input signal (signal 407 for CFR & NS circuit 408 and signal 437 for CFR & NS circuit 434), where the cancellation signal is: (1) in an unused frequency band outside of the band of operation 212; and (2) out-of-phase with one or more peaks of the input signal. The result of adding the cancellation signal is that the peak(s) of the input signal are canceled, thereby reducing the PAPR and/or CFR of the signals 409 and 435 relative to the signals 407 and 437, respectively. The CFR/PAPR reduction thus takes advantage of the fact that there is an unused frequency band on the communication medium, as is the case on the coax plant of a DOCSIS network. The noise shaping may, for example, use noise shaping techniques known in the art of delta-sigma modulation.

Figure 5A:
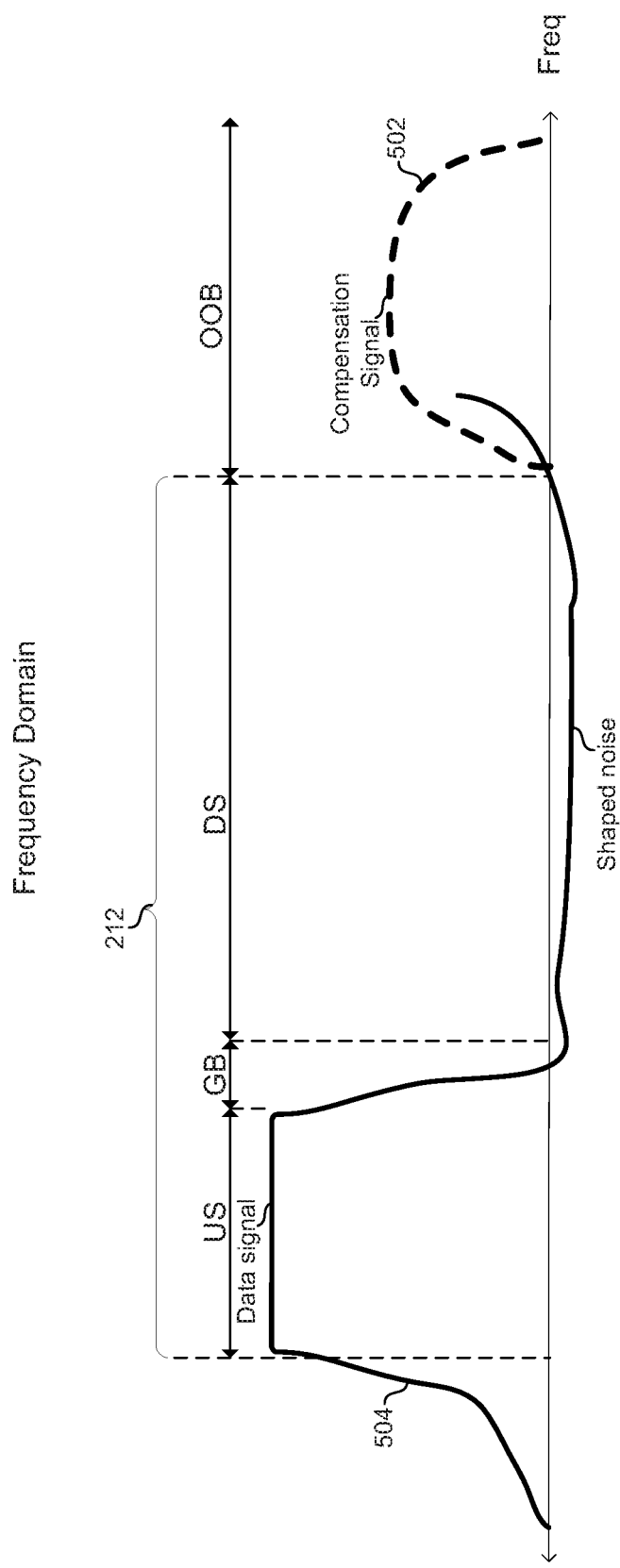
FIG. 5A shows a frequency domain representation of echo cancellation leveraging out-of-band frequencies.

FIG. 5A shows an example signal 504 corresponding to a noise-shaped version of a signal input to a CFR & NS circuit (504 corresponds to a noise-shaped version of signal 407 in the case of CFR & NS circuit 408 and corresponds to noise-shaped version of signal 437 in the case of CFR & NS circuit 434). The signal 502 is a cancellation signal added by the CFR & NS circuit. Thus, the result of combining 504 and 502 corresponds to signal 409 in the case of CFR & NS circuit 408 and signal 435 in the case of CFR & NS circuit 434.

Figure 5B:
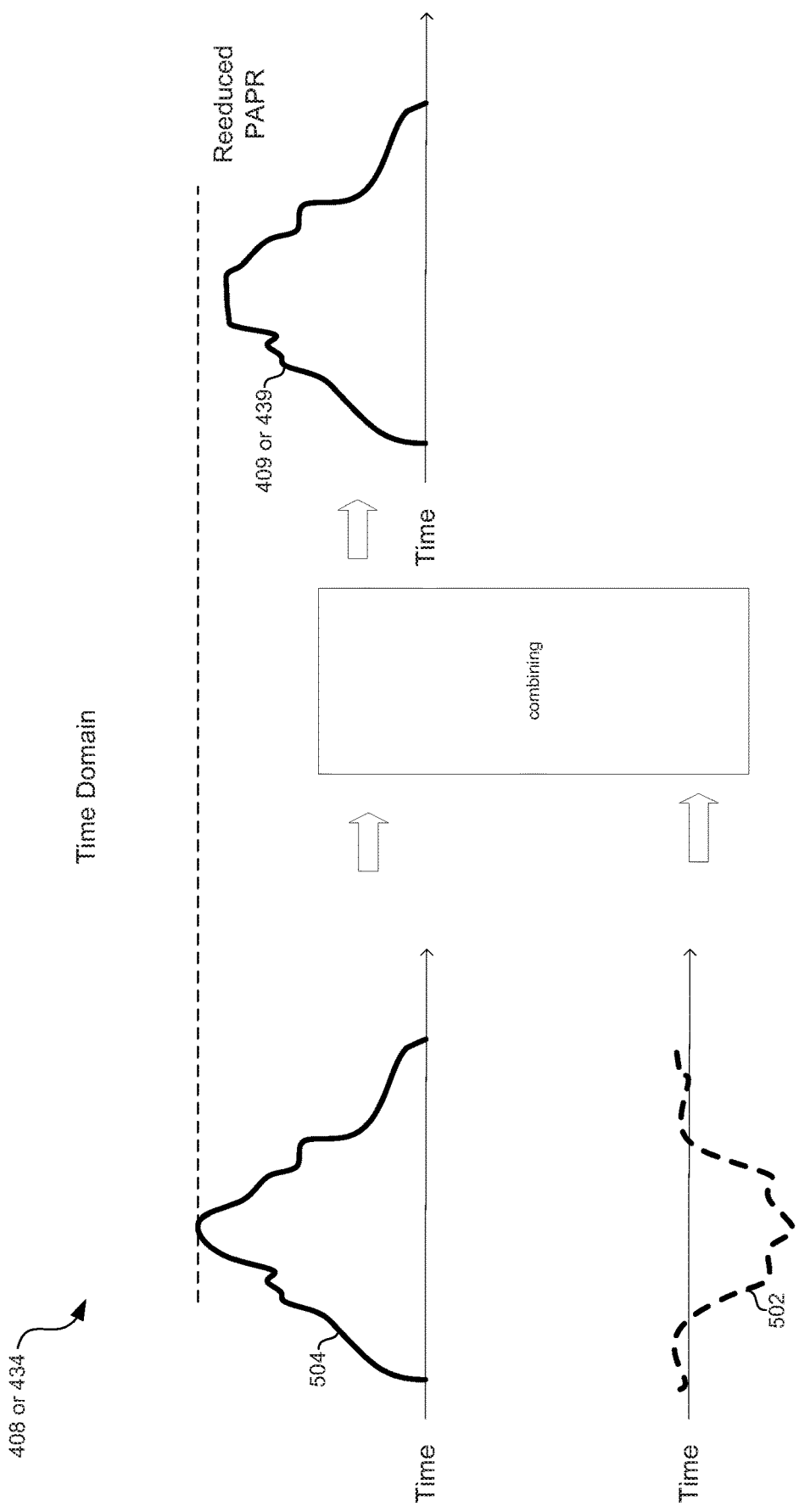
FIG. 5B shows a time domain representation of echo cancellation leveraging out-of-band frequencies.

FIG. 5B illustrates combining of the noise-shaped signal and the cancellation signal in a CFR & NS circuit 408 or 434 to generate a reduced-PAPR signal 409 or 435.

In accordance with an example implementation of this disclosure, an electronic communication device (e.g., $112_n$) comprises echo cancellation circuitry (e.g., 406 and/or 436) and signal modification circuitry (e.g., 408, 410, 412, 414, 416, 418, 420, 434, 432, 430, and/or 428). The echo cancellation circuitry may be operable to generate a first signal (e.g., 407 or 437) that approximates interference present in a second signal (e.g., 439). The signal modification circuitry may be operable to generate a first cancellation signal (e.g., 502 in 408 or 434) in a frequency band that is not used on a communication medium over which the electronic communication device is configured to communicate (e.g., outside of band 212, which may, for example, comprise frequencies above 2 GHz in a DOCSIS 3.1 network). The signal modification circuitry may be operable to combine (e.g., in 408 or 434) the first cancellation signal with the first signal, wherein the combining of the signals results in a modified first signal (e.g., 409 or 435) that has a lower crest factor and/or peak-to-average power ratio than the first signal. The signal modification circuitry may be operable to combine (e.g., at 428) the modified first signal with the second signal to reduce interference present in the second signal. The electronic device may comprise noise shaping circuitry (e.g., in 408 and/or 434) operable to noise shape the first signal prior to the combining of the first signal and the first cancellation signal. The communication medium may be a coaxial cable on which Data Over Cable Service Interface Specification (DOCSIS®) signals are communicated. The echo cancellation circuitry may be operable to generate a third signal (e.g., 437 or 407) that approximates interference present in the second signal. The signal modification circuitry may be operable to generate a second cancellation signal (e.g., 502 in 434 or 408) in a frequency band that is not used on a communication medium over which the electronic communication device is configured to communicate (e.g., outside band 212, which may, for example, comprise frequencies above 2 GHz in a DOCSIS 3.1 network). The signal modification circuitry may be operable to combine (e.g., in 434 or 408) the second cancellation signal with the third signal, wherein the combining of the signals results in a modified third signal having a lower crest factor and/or peak-to-average power ratio than the third signal. The signal modification circuitry may be operable to combine (e.g., at 422 after the second signal has been processed by 428, 426, and 424) the modified third signal with the second signal to reduce interference present in the fourth signal. The electronic device may comprise noise shaping circuitry (e.g., in 434 and/or 408) operable to noise shape the third signal prior to the combining of the third signal and the second cancellation signal.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the methods described herein.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
   an electronic communication device comprising echo cancellation circuitry and signal modification circuitry, wherein:
   the echo cancellation circuitry is operable to generate a first signal that is an out of phase approximation of interference present in a second signal;
   the signal modification circuitry is operable to:
   generate a first cancellation signal in a frequency band that is not used on a communication medium over which the electronic communication device is configured to communicate;
   combine the first cancellation signal with the first signal, wherein the combining of the signals results in a modified first signal that has a lower crest factor and/or peak-to-average power ratio than the first signal; and
   combine the modified first signal with the second signal to reduce interference present in the second signal.

2. The system of claim 1, wherein the electronic device comprises noise shaping circuitry operable to noise shape the first signal prior to the combining of the first signal and the first cancellation signal.

3. The system of claim 1, wherein the communication medium is a coaxial cable on which Data Over Cable Service Interface Specification (DOCSIS®) signals are communicated.

4. The system of claim 3, wherein the second signal is a signal received by the electronic communication device.

5. The system of claim 4, wherein the second signal is a downstream full-duplex DOC SIS signal.

6. The system of claim 1 comprising:
   wherein the echo cancellation circuitry is operable to generate a third signal that approximates interference present in the second signal; and
   the signal modification circuitry is operable to:
   generate a second cancellation signal in a frequency band that is not used on a communication medium over which the electronic communication device is configured to communicate;
   combine the second cancellation signal with the third signal, wherein the combining of the signals results in a modified third signal having a lower crest factor and/or peak-to-average power ratio than the third signal; and combine the modified third signal with the second signal to reduce interference present in the second signal.

7. The system of claim 6, wherein the electronic device comprises noise shaping circuitry operable to noise shape the third signal prior to the combining of the third signal and the second cancellation signal.

8. The system of claim 6, wherein the communication medium is a coaxial cable on which Data Over Cable Service Interface Specification (DOCSIS®) signals are communicated.

9. The system of claim 6, wherein the second signal is a signal received by the electronic communication device.

10. The system of claim 9, wherein the second signal is a downstream full-duplex DOC SIS signal.

11. A method comprising:
  generating, by echo cancellation circuitry of an electronic communication device, a first signal that is an out of phase approximation of interference present in a second signal;
  generating, by signal modification circuitry of the electronic communication device, a first cancellation signal in a frequency band that is not used for communications on a communication medium over which the electronic communication device communicates;
  combining, by the signal modification circuitry, the first cancellation signal with the first signal, the combining resulting in a modified first signal having a lower crest factor and/or peak-to-average power ratio than the first signal; and
  combining, by the signal modification circuitry, the modified first signal with the second signal to reduce interference present in the second signal.

12. The method of claim 11, comprising noise shaping, by noise shaping circuitry of the electronic communication device, the first signal prior to combining the first signal and the first cancellation signal.

13. The method of claim 11, wherein the communication medium is a coaxial cable on which Data Over Cable Service Interface Specification (DOCSIS®) signals are communicated.

14. The method of claim 13, wherein the second signal is a signal received by the electronic communication device.

15. The method of claim 14, wherein the second signal is a downstream fullduplex DOC SIS signal.

16. The method of claim 11, comprising:
  generating, by echo cancellation circuitry of an electronic communication device, a third signal that approximates interference present in the second signal;
  generating, by signal modification circuitry of the electronic communication device, a second cancellation signal in a frequency band that is not used for communications on a communication medium over which the electronic communication device communicates;
  combining, by the signal modification circuitry, the second cancellation signal with the third signal, the combining resulting in a modified third signal having a lower crest factor and/or peak-to-average power ratio than the third signal; and
  combining, by the signal modification circuitry the modified third signal with the second signal to reduce interference present in the second signal.

17. The method of claim 16, comprising noise shaping, by noise shaping circuitry of the electronic communication device, the third signal prior to the combining the third signal and the second cancellation signal.

18. The method of claim 16, wherein the communication medium is a coaxial cable on which Data Over Cable Service Interface Specification (DOCSIS®) signals are communicated.

19. The method of claim 16, wherein the second signal is a signal received by the electronic communication device.

20. The method of claim 19, wherein the second signal is a downstream fullduplex DOC SIS signal.

* * * * *